3,315,066
PHOTO-SCANNING METHOD AND APPARATUS FOR DIRECT MEASUREMENT OF PARTICLE SIZE DISTRIBUTION OF POWDER

Akinori Muta, Suginami-ku, Tokyo-to, Yasuhiko Uehara, Kitatama-gun, Tokyo-to, and Masaru Kurata, Ota-ku, Tokyo-to, Japan, assignors to Kabushiki Kaisha Hitachi Seisakusho, Tokyo-to, Japan, a joint-stock company of Japan
Filed Feb. 26, 1963, Ser. No. 261,008
Claims priority, application Japan, Feb. 26, 1962, 37/6,573; Feb. 12, 1963, 38/5,797, 38/5,798
3 Claims. (Cl. 235—151.3)

This invention relates to a new optical method of measuring particle size distributions of powder substances based on a new utilization of the laws of sedimentation and relates to a new apparatus for carrying the said method into practice.

Conventional optical methods of measuring particle size distributions depending on the laws of sedimentation, which have been practiced heretofore, have generally comprised: placing, in a cell having parallel, clear side walls, a liquid suspension in which particles of a powder have been uniformly dispersed; projecting a thin light beam of parallel rays which is perpendicular to the said walls and, at the same time, parallel to the liquid surface of the said suspension at a point at a certain depth from the said liquid surface; receiving the resulting transmitted light by means of a photoelectric converter; obtaining the variation with time of the intensity of the said transmitted light, which varies in accordance with the sedimentation of the particles, as a photoelectric output; recording by a suitable method a curve of the relationship between the said transmitted light intensity, that is, the particle concentration, and time; and further analyzing the said curve to obtain a particle size distribution curve. Accordingly, in order to obtain a particle size distribution curve by this method, it has been necessary to resort to the two procedural steps of recording a curve and analyzing the same, and, moreover, these two steps have required considerable time and labor, which have been great disadvantages of this method.

The present invention, in its broader aspects, contemplates the elimination of the disadvantages, such as those stated above, which accompany conventional optical methods of measuring particle size.

More specifically, it is an object of the invention to provide a new and original, photo-scanning method of directly measuring particle size distributions of powders which is relatively simple and requires a remarkably short total time and little labor for complete measurement.

It is another object of the invention to provide a method as stated above which is substantially accurate, requires a relatively small quantity of sample, and is applicable to a wide range of uses.

It is a further object of the invention to provide apparatus of relative simple construction and operation suitable for carrying the above-stated method into practice.

The foregoing objects have been achieved by the present invention which is based on a principle which differs completely from that of optical particle size measurement methods practiced heretofore and has been derived from an analysis of the sedimentation theory of particles, with the hypothesis that, in a uniform suspension of particles, the particle size distribution curve can be obtained also by measuring the change of particle concentration in the direction of the liquid depth at any arbitrary time after the start of sedimentation of the particles.

To faciliate a clearer and fuller understanding of principle of the invention, a detailed consideration of the results of the analysis of sedimentation theory of particles, on which this principle is based, is set forth below.

It will first be considered that a suspension in which particles are uniformly dispersed is placed in a cell having mutually parallel, transparent side walls; this suspension is scanned during a short time from the liquid surface of the said suspension in the direction of its depth at any time after the start of sedimentation of the particles, by a thin beam of parallel light rays which is perpendicular to the said side walls and, at the same time, parallel to the said liquid surface; and the intensity of the resulting transmitted light is measured on the side of the cell opposite the side the light source emitting the said thin beam. In this case, if it is assumed that this intensity of transmitted light has a certain relationship to the total cross-sectional area of the particles, the following equation of relationship is obtained.

$$\log \frac{Io}{I} = \pi l \int_0^r r^2 n(r) dr \qquad (1)$$

where $Io$ is the intensity of incident light; $I$ is the intensity of transmitted light; $l$ is the thickness of suspension; $r$ is the particle radius; and $n(r)$ represents the number distribution of the particles. Here, it is assumed, furthermore, that the absorption of light by the cell walls and the liquid may be neglected.

Also, from Stoke's Law, the following equation is obtained.

$$r = \sqrt{\frac{9\eta h}{2g(\rho d - \rho m)t}} = \sqrt{\frac{k_1 h}{t}} \qquad (2)$$

where $r$ is the particle radius; $\eta$ is the coefficient of viscosity of the liquid in which the particle are suspended; $\rho d$ is the specific gravity of the particles; $\rho m$ is the specific gravity of the liquid in which the particles are suspended; and $h$ represents the distance in the depth direction through which a particle of radius $r$ is suspended within a time $t$.

When Equation 1 is differentiated with respect to $r$ and Equation 2 is substituted thereinto, the number distribution function $n(r)$ becomes as follows:

$$n(r) = -\frac{2}{\pi l} \cdot \frac{1}{r^3} \cdot \frac{dI}{dh} \cdot \frac{h}{I} \qquad (3)$$

On one hand, the weight distribution function $W(r)$ may be represented by the following equation.

$$W(r) = \frac{4}{3}\pi r^3 \rho d n(r) \qquad (4)$$

From Equations 3 and 4, the following equations are obtained:

$$W(r) = -\frac{8\rho d}{3l} \cdot \frac{dI}{dh} \cdot \frac{h}{I} \qquad (5)$$

$$= -K_2 \frac{dI}{dh} \cdot \frac{h}{I}$$

$$W(r) = -K_2 \frac{d(\log I)}{dh} \cdot h \qquad (5')$$

where $$K_2 = \frac{8\rho d}{3l} = \text{constant}$$

A curve of ($W(r)$ versus $r$) indicates the particle size distribution, and since $K_2$ in Equation 5 is a constant, the particle size distribution is obtained by determining the relationship.

$$\left(-\frac{dI}{dh} \cdot \frac{h}{I} \text{ versus } r, \text{ or } -\frac{d(\log I)}{dh} \text{ versus } r\right)$$

from Equations 5 and 5'.

The objects of the present invention have been achieved through the utilization and carrying into practice of the teachings and results of the foregoing consideration.

The specific nature and details of the invention will be more clearly apparent by reference to the following description, including two examples of procedure and apparatus in accordance with the invention which are presented for the purpose of illustration and not of limitation, when taken in conjunction with the accompanying drawings in which.

Figure 4:
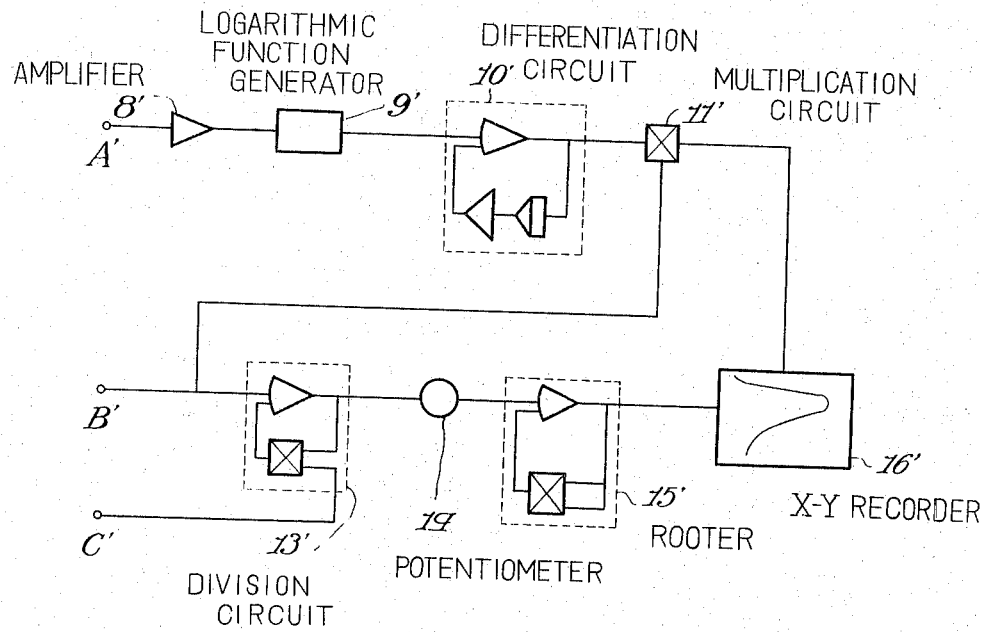
Figure 5B:
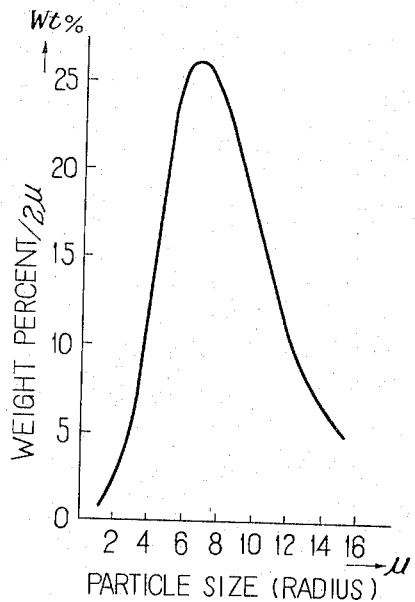
Figure 5A:
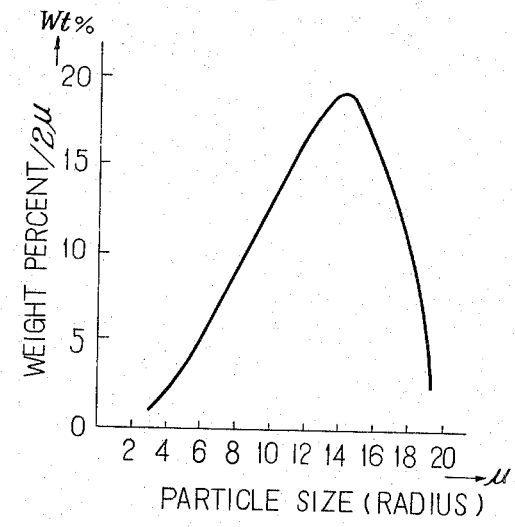

FIG. 4 is a block diagram showing one embodiment of an automatic computer circuit according to a logarithmic calculating method of direct measurement of a particle size distribution curve; and FIGS. 5a and 5b are graphical representations indicating particle size distributions of certain powders, that is, curves indicating the relationships between the weight distribution function and particle radius.

*Example 1*

Figure 1:
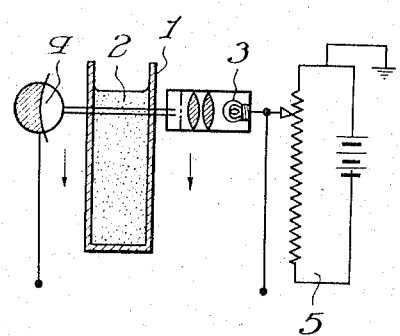
FIG. 1 is a schematic diagram showing the optical system of the sample measurement section of an apparatus suitable for the practice of the invention.

Referring to FIG. 1, the optical system of the sample measurement section of an apparatus according to the invention comprises: a cell 1 with mutually-parallel, transparent, planar side walls containing a suspension 2; a light projector 3 to be movable with a motor (not shown) in the direction of depth of the said suspension 2 and, at the same time, its movement can be coupled to the control movement of a potentiometer 5 in such a manner that a voltage which is proportional to the position of the light projector 3, that is, the depth from the liquid surface of the suspension 2, is created in the potentiometer 5; and a photoelectric converter 4 adapted to receive continually a light beam projected from the projector 3 and transmitted through the cell 1 and to generate a photoelectric voltage proportional to the intensity of the transmitted light.

Figure 2:
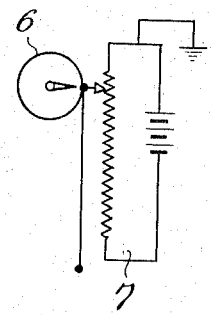
FIG. 2 is a schematic diagram of a device for deriving the lapse of time as an electrical output, which is suitable for use in conjunction with the optical system shown in FIG. 1.

The above-described optical system is operated in the following manner. After the suspension 2 is placed in the cell 1, the said liquid is agitated to disperse the suspended particles uniformly. The instant at which sedimentation begins is taken as the starting point of time, and, after an arbitrary time period thereafter, the light projector is caused, by means of the aforementioned motor to scan at a constant velocity from the liquid surface of the suspension 2 downwardly in the depth direction. As a result, in accordance with this scanning, the output voltage I of the photoelectric converter 4 and a divided voltage h of the potentiometer 5 vary. In order to measure these variations of the transmitted light intensity and the voltage which is proportional to the depth, with respect to the suspension, of the position of the scanning light beam, as well as the time after the start of sedimentation, a potentiometer 7 is coupled to a timer 6 as indicated in FIG. 2, and the elapsed time after the agitation of the suspension to obtain uniform dispersion is caused to register as the variation of a divided voltage t of the potentiometer 7. From the above-described variations of the transmitted light intensity, the divided voltage which is proportional to the position of the scanning light beam from suspension surface, namely h, and the divided voltage coupled to the lapse of time, the particle size distribution is computed in accordance with the theoretical equations set forth hereinbefore by means of an automatic computer circuit, one example of which is indicated by the block diagram shown in FIG. 3.

Figure 3:
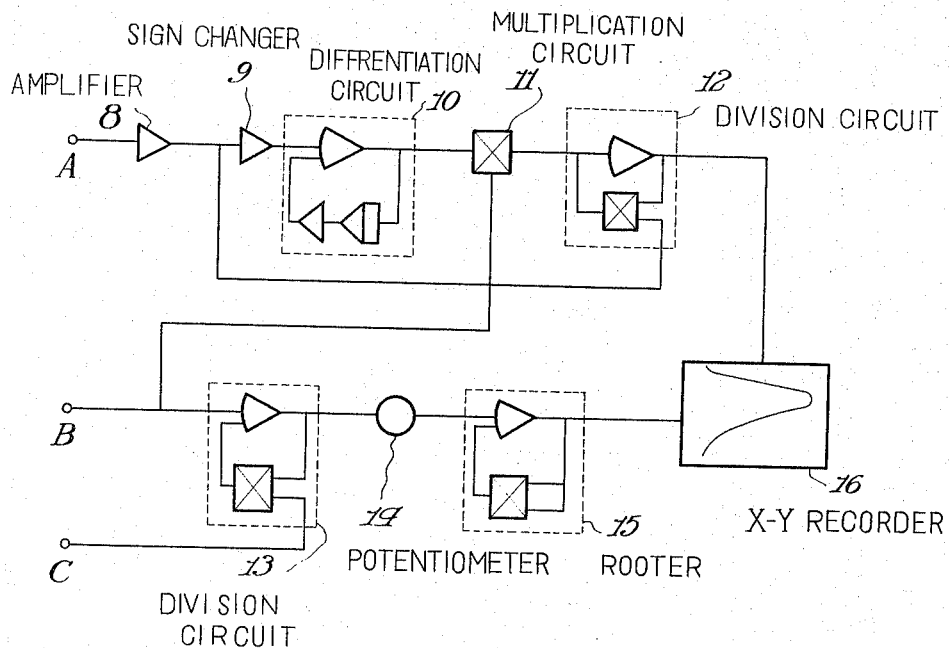
FIG. 3 is a block diagram showing one embodiment of an automatic computer circuit for direct measurement according to the measurement method of the invention.

Referring to FIG. 3, the variation of the aforementioned photoelectric output voltage I, the divided voltage h of the potentiometer 5, and the divided voltage t of the potentiometer 7 are led to the terminals designated by reference letters A, B, and C respectively. The photoelectric output voltage I is amplified in an amplifier 8, changed in sign to —I in a sign change 9, and differentiated in a differentiation circuit 10 to produce a derivative $$-\frac{dI}{dh}$$

which is transformed in a multiplication circuit 11 into $$-\frac{dI}{dh}\cdot\frac{h}{1}$$

which is transformed in a division circuit 12 into $$-\frac{dI}{dh}\cdot\frac{h}{I}$$

which is led to the Y-side terminal of an X-Y recorder 16. The divided voltage h led to the terminal B form the potentiometer 5 is divided in a division circuit 13, which is coupled to the divided voltage t of the potentiometer 7 led to the terminal C, to produce a quotient $$\frac{h}{t}$$

which is multiplied in a potentiometer 14 by Stokes' sedimentation equation (Equation 2), $$K_1=\frac{9\eta}{2g(\rho d-\rho m)}$$

to produce a product $$K_1\frac{h}{t}$$

which is transformed in a rooter 15 into $$\sqrt{K_1\frac{h}{t}}=r$$

which is led to the X-side terminal of the X-Y recorder 16. Thus, in the recorder 16, a curve of $$-\frac{dI}{dh}\cdot\frac{h}{I}$$

versus r is plotted, as shown in FIG. 5. Thus curve, from Equation 5, represents the curve of W(r) versus r, that is, it indicates the particle size distribution.

*Example 2*

It is possible to obtain the above-described particle size distribution curve, W(r) versus r, also by combining a logarithmic computing circuit with an electronic computer circuit through the utilization of the logarithmic equation (Equation 5′). Specifically, the photoelectric output voltage I of the photoelectric converter 4, the divided voltage h of the potentiometer 5, and the divided voltage t of the potentiometer 7 are led to the terminals designated by reference letters A′, B′, and C′, respectively, as indicated in FIG. 4. The photoelectric output voltage I is amplified in an amplifier 8′ and transformed in a logarithmic function generator 9′ into log I, which is differentiated in a differentiation circuit 10′ to produce a derivative $$-\frac{d(\log I)}{dh}$$

which is multiplied in a multiplication circuit 11′ to produce a product $$-\frac{d(\log I)}{dh}$$

which is led to the Y-side terminal of an X-Y recorder 16′. The divided voltage h introduced through the terminal B is divided in a division circuit 13′, which is coupled to the divided voltage $t$ introduced through the terminal C', to produce a quotient $$-\frac{h}{t}$$

which is multiplied by Stokes' coefficient $K_1$ in a potentiometer 14' to produce $$-\frac{K_1 h}{t}$$

which is transformed in rooter 15' into $$\sqrt{\frac{K_1 h}{t}} = r$$

which is led to the X-side terminal of the X-Y recorder 16', whereby a $W(r)$ versus $r$ record is plotted in the recorder 16'.

In order to indicate still more fully the advantageous effectiveness of the present invention, comparative results of determination of the particle size distributions of carborundum powder and a fluorescent material powder by the method of the present invention and by a conventional optical measurement method or presented in the accompanying Table 1.

TABLE 1

| Sample | Specific Gravity | Average Particle Diam. ($\mu$) | Measurement By Method of Present Invention | | | Measurement of Conventional Method | | |
|---|---|---|---|---|---|---|---|---|
| | | | Sample Weight (mg.) | Measuring Time | Analyzing Time (min.) | Sample Weight (mg.) | Measuring Time (min.) | Analyzing Time (min.) |
| Carborundum | 3.12 | 3.5 | 45–65 | 2–3 min | 0 | 45–60 | 50–80 | 40 |
| Fluorescent material | 3.18 | 5 | 65–85 | 50–70 sec | 0 | 65–85 | 25–40 | 40 |

From Table 1 it is apparent that the time required for measurement by the method of the present invention is shorter, by a considerable difference, than that by a conventional optical measurement method.

Moreover, it has been found from measurements by the method of this invention of particle size distributions of powders of numerous and various kinds of substances, such as graphite, carborundum, and fluorescent materials, that the measured results agree well those obtained by conventional optical measurement methods.

It is to be observed that the present invention is advantageously applicable to a wide range of uses, such as, for example, research on pulverization and measurement of particle size distributions of various treated powders in industries in which pulverized substances are handled. Moreover, in such applications the present invention is highly advantageous since it affords accurate measurement in an extremely short time with a very small sample quantity.

Although this invention has been described with respect to particular embodiments thereof, it is not to be so limited as changes and modifications can be made therein which are within the full intended scope of the invention, as defined by the appended claims.

What is claimed is:

1. A direct method of measuring the particle size distribution of powders by an optical method comprising the steps of:
   (a) uniformly suspending the particles to be measured in a liquid which is contained in a cell having transparent, mutually parallel, planar, perpendicular side walls;
   (b) after a short time $t$ at which the sedimentation of the particles in said liquid had taken place, scanning said cell within a short time in which the distribution of the particles in said liquid does not change, in the depth direction of said cell by collimated thin light beam which is projected perpendicularly toward said cell wall and, at the same time, generating an electrical output $h$ which is proportional to the depth of said suspension surface corresponding to the position of said light beam in said suspension;
   (c) receiving the light beam transmitted through said cell by a photoelectric converter which generates the electrical output $I$ proportional to said transmitted light beam intensity; and
   (d) computing the weight particle size distribtuion function $W(r)$ as the function of particle radius $r$ from the following two equations:

$$r = \sqrt{\frac{K_1 h}{t}}$$

$$W(r) = -K_2 \frac{dI}{dh} \cdot \frac{h}{I} \text{ or } -K_2 \frac{d(\log I)}{dh} \cdot h$$

wherein
$r$ = particle radius $$K_1 = \frac{9\zeta}{2g(\rho d - \rho m)} = \text{constant}$$

$g$ = gravity acceleration
$\zeta$ = viscosity coefficient of the liquid
$\rho d$ = specific gravity of the particles
$\rho m$ = specific gravity of the liquid
$t$ = time from the start of the sedimentation of the particles in the liquid to the start of the scanning of the cell $$K_2 = \frac{8\rho d}{3l} = \text{constant}$$

and
$l$ = thickness of the suspension.

2. A direct-measuring, particle size analyzer comprising a cell having transparent, mutually-parallel, planar, perpendicular side walls and containing a liquid suspension of the particles to be measured; a collimated thin light beam source disposed on one side of said cell to project said light beam perpendicularly toward said side wall and, at the same time, to scan downwardly in the depth direction of said suspension; means for generating an electrical output $h$ which is proportional to the depth from said suspension surface corresponding to the position of said light beam in said suspension, means for generating an electrical output $t$ which is proportional to the time elapsed from the start of the sedimentation of the particles in said liquid to the start of said light beam scanning; means for receiving said transmitted light beam through said cell and generating an electrical output $I$ which is proportional to the transmitted light beam intensity; and an automatic computer which receives said electrical outputs $h$, $t$ and $I$ and computes the following two equations to obtain the weight particle size distribution function $W(r)$ as the function of particle radius $r$:

$$r = \sqrt{\frac{K_1 h}{t}}$$

$$W(r) = -K_2 \frac{dI}{dh} \cdot \frac{h}{I} \text{ or } -K_2 \frac{d(\log I)}{dh} \cdot h$$

wherein
r = particle radius, cm.

$$K_1 = \frac{9\zeta}{2g(d-m)} = \text{constant}$$

g = gravity acceleration, 980 cm./Sec.²
ζ = viscosity coefficient of the liquid, g./cm. sec.
ρd = specific gravity of the particles, g./cm.³
ρm = specific gravity of the liquid, g./cm.³
t = time from the start of the sedimentation of the particles in the liquid to the start of the scanning of the cell, in seconds, $$K_2 = \frac{8\rho d}{3l} = \text{constant},$$

and
l = thickness of the suspension, cm.

3. A direct-measuring particle size analyzer comprising:
 (a) a cell having transparent, mutually parallel, planar, perpendicular side walls and containing a liquid suspension of the particles to be measured;
 (b) a collimated thin light beam source disposed on one side of said cell and so adapted to project perpendicularly toward said side wall and at the same time, to scan in the depth direction of said suspension;
 (c) means for generating an electrical output h which is proportional to the depth from said suspension surface corresponding to the position of said moving light beam in said liquid;
 (d) means for generating an electrical output t which is proportional to the time elapsed from the start of the sedimentation of the particles in said liquid to the start of said light beam scanning;
 (e) means for generating an electrical output I which is proportional to the intensity of the transmitted light beam through said cell; and
 (f) an automatic computer which receives said electrical outputs h, t and I and computes the following two equations to obtain the weight particle size distribution function W(r) as the function of particle radius r:

$$r = \sqrt{\frac{K_1 h}{t}}$$

$$W(r) = K_2 \frac{dI}{dh} \cdot \frac{h}{I} \text{ or } -K_2 \frac{d(\log I)}{dh} \cdot h$$

wherein
r = particle radius, cm.

$$K_1 = \frac{9\zeta}{2g(\rho d - \rho m)} = \text{constant}$$

g = gravity acceleration, 980 cm./sec.²
ζ = viscosity of the liquid, g./cm. sec.
ρd = specific gravity of the particle, g./cm.³
ρm = specific gravity of the liquid, g./cm.³
t = time from the start of the sedimentation of the particles in the liquid to the start of the scanning of the cell, in seconds, $$K_2 = \frac{8\rho d}{3l} = \text{constant}$$

and
l = thickness of the suspension.

References Cited by the Examiner
UNITED STATES PATENTS
2,731,202  1/1956  Pike _____ 235—92

MALCOLM A. MORRISON, *Primary Examiner.*

A. J. SARLI, *Assistant Examiner.*